(12) United States Patent
Schiavoni et al.

(10) Patent No.: US 10,764,051 B2
(45) Date of Patent: Sep. 1, 2020

(54) PRIVACY-PRESERVING IDENTITY VERIFICATION

(71) Applicant: Google LLC, Mountain View, CA (US)

(72) Inventors: Stefano Schiavoni, London (GB); Simon Morris, Cambridge (GB); Phillips Benton, London (GB); Tom Pritchard, London (GB)

(73) Assignee: Google LLC, Mountain View, CA (US)

( * ) Notice: Subject to any disclaimer, the term of this patent is extended or adjusted under 35 U.S.C. 154(b) by 2 days.

(21) Appl. No.: 16/080,216

(22) PCT Filed: Oct. 25, 2017

(86) PCT No.: PCT/US2017/058185
§ 371 (c)(1),
(2) Date: Aug. 27, 2018

(87) PCT Pub. No.: WO2019/083517
PCT Pub. Date: May 2, 2019

(65) Prior Publication Data
US 2019/0363885 A1    Nov. 28, 2019

(51) Int. Cl.
*H04L 29/06* (2006.01)
*H04L 9/32* (2006.01)
*G06F 16/245* (2019.01)

(52) U.S. Cl.
CPC .......... *H04L 9/3213* (2013.01); *G06F 16/245* (2019.01); *H04L 9/3239* (2013.01)

(58) Field of Classification Search
CPC .................................. G06F 21/31; G06F 21/46
See application file for complete search history.

(56) References Cited

U.S. PATENT DOCUMENTS 8,347,093 B1    1/2013  Ahmed
8,788,836 B1    7/2014  Hernacki et al.
(Continued)

FOREIGN PATENT DOCUMENTS

GB        2561875 A      10/2018

OTHER PUBLICATIONS

International Search Report and Written Opinion for Application No. PCT/US2017/058185 dated Jun. 8, 2018. 14 pages.
(Continued)

*Primary Examiner* — Tri M Tran
(74) *Attorney, Agent, or Firm* — Lerner, David, Littenberg, Krumholz & Mentlik, LLP (57) ABSTRACT

Aspects of the technology implement a authenticating protocol that enables a Trusted Provider to vouch for a requesting entity when that entity seeks verification from an authenticating entity (FIG. 1). This is done without sharing the requesting entity's confidential or other personal information directly with the authenticating entity (FIG. 1). Instead, the Trusted Provider is able to use specific information about a requesting entity, such as contact information that forms an identity record (404), and generate a hash of the record (408). The hash is sent to an authenticating entity (410), which returns a secure token to the Trusted Provider (508). The secure token and identity record information are used to create a verification URL (414), which is shared with the requesting entity (416). The verification URL, when clicked, links back to the authenticating entity (FIG. 1), which validates the requesting entity (512, 514). This allows for instant identification of the requesting entity without the parties having to perform advanced cryptographic operations (516).

21 Claims, 6 Drawing Sheets

(56) References Cited

U.S. PATENT DOCUMENTS

| | | | |
|---|---|---|---|
| 9,971,574 B2* | 5/2018 | Mathew | G06F 8/40 |
| 10,114,975 B1* | 10/2018 | Sun | G06F 21/6209 |
| 2004/0006693 A1* | 1/2004 | Vasnani | H04L 63/0807 |
| | | | 713/168 |
| 2013/0074168 A1* | 3/2013 | Hao | H04L 9/3213 |
| | | | 726/7 |
| 2013/0111570 A1* | 5/2013 | Kaariainen | H04L 63/08 |
| | | | 726/5 |
| 2015/0047003 A1 | 2/2015 | Khan | |

OTHER PUBLICATIONS

Combined Search and Examination Report for United Kingdom Patent Application No. 1813959.2, dated Feb. 25, 2019. 8 pages.
International Preliminary Report on Patentability for International Application No. PCT/US2017/058185 dated May 7, 2020. 9 pages.

* cited by examiner

PRIVACY-PRESERVING IDENTITY VERIFICATION

CROSS-REFERENCE TO RELATED APPLICATION

This application is a national phase entry under 35 U.S.C. § 371 of International Application No. PCT/US2017/058185, filed 25 Oct. 2017, the entire disclosure of which is incorporated herein by reference.

BACKGROUND

E-commerce and other web-based activities often involve one party verifying the identity of another party. Verification may be performed in different ways. In one instance, an Internet Certification Authority or Certificate Authority may issue a digital certificate that contains credential information to aid a person or business in on-line transactions. However, this type of approach may require the different parties to perform advanced cryptographic operations. It may also necessitate storage of sensitive information beyond what would normally be required for day to day work, or otherwise involve additional managerial or resource overhead that is inefficient or cumbersome. Thus, this type of approach may not be feasible for certain parties, whether they are individuals, small businesses or other entities.

BRIEF SUMMARY

The identity verification techniques described herein are simple to implement while still preserving the privacy of one party (a requesting entity) that desires to identify itself to another party (an authenticating entity). The general approach is based on the following factors. First, an intermediary (a Trusted Provider) can already identify the requesting entity (such as a person or company), e.g., in accordance with a preexisting relationship. Second, the Trusted Provider cannot share readable data about the requesting entity with the authenticating entity. There may be legal or contractual agreements that prevent such sharing of information. And third, the Trusted Provider should have to do as little work as possible to assist in the verification process. This may include keeping a spreadsheet or performing basic computations, but not calculating digital signatures or storing highly sensitive information about the business.

Aspects of the technology described below enable the Trusted Provider to use their specific information about a requesting entity to allow for instant identification or authentication of that requesting entity with a particular authenticating entity. The Trusted Provider may be a business to business (B2B) service provider such as a bank or telecommunication company. The Trusted Provider's specific information about a given person, merchant, business or other requesting entity may include its address, point of contact, and other identification data that it relies on in normal transactions with that business. This information is hashed in a particular manner for sharing with a given authenticating entity. The authenticating entity generates a secure token based on the hashed information that the Trusted Provider uses to create a verification link. The requesting entity is then able to use the verification link, which provides for instant identification of the requesting entity by the authenticating entity.

According to aspects of the technology, a method includes processing, by one or more processor devices, a plain-text message using a hash function to generate a hash value of the plain-text message. The plain-text message includes contact information about a requesting entity. The method also includes sending, by a communication unit, the generated hash value to a second external device of an authenticating entity, and receiving, by the communication unit, a secure token from the second external device of the authenticating entity in response to sending the generated hash value. The method further includes creating by the one or more processing devices, and responsive to receiving the secure token from the second external device of the authenticating entity, a verification indication based on the secure token and the plain-text message. The method also includes sending, by the communication unit, the verification indication to the first external device of the requesting entity.

In one example, the processing is performed in response to receiving the plain-text message from a first external device of a requesting entity, the plain-text message comprising the contact information of the requesting entity. In another example, the plain-text message comprises the contact information includes a physical address of a business or person associated with the requesting entity. In a further example, the plain-text message comprises an identity javascript object notification (JSON) of the contact information.

In an alternative, the method further includes adding a salt element to the plain-text message and processing the plain-text message with the pre-defined salt element using the hash function. Here, sending the verification indication to the first external device of the requesting entity comprises sending a verification URL incorporating the secure token and information of the plain-text message to the first external device.

According to other aspects of the technology, a device is provided which comprises a communication unit and one or more processors. The one or more processors are configured to retrieve, from memory, a plain-text message containing information of a requesting entity, process the plain-text message using a hash function to generate a hash value of the plain-text message, and create a verification indication based on the plain-text message and a secure token received from a second external device of an authenticating entity. The plain-text message includes contact information about the requesting entity. The communication unit is further configured to send the verification indication to a first external device of the requesting entity in response to receiving the secure token from the second external device of the authenticating entity.

In one example, the plain-text message comprises the contact information of the requesting entity. In another example, the plain-text message comprises the contact information including a physical address of a business or person associated with the requesting entity. In a further example, the plain-text message comprises an identity javascript object notification (JSON) of the contact information.

In an alternative, the one or more processors are further configured to add a salt element to the plain-text message and process the plain-text message with the pre-defined salt element using the hash function. Here, the device is able to send the verification indication to the first external device of the requesting entity by sending a verification URL incorporating the secure token and information of the plain-text message to the first external device.

According to further aspects of the technology, a method is provided. The method includes, responsive to receiving a hash value from a computing device of a trusted provider, storing the hash value in memory. The hash value corresponds to plain-text information associated with a requesting entity. The plain-text information includes contact information about the requesting entity. The method also includes generating, by one or more processor devices, a secure token associated with a storage location of the hash value. Responsive to receiving a verification message from a first external device of the requesting entity, the method includes processing, by the one or more processor devices, the verification message using a hash function to generate a hash value, retrieving the hash value stored in the memory, comparing a generated hash value with the hash value retrieved from the memory, and comparing the generated secure token with token information in the verification message, in order to verify an identify of the requesting entity.

In one example, generating the secure token associated with the storage location comprises generating a random token string and recording an association between the random token string and the storage location. In another example, a length of the random token string is at least 16 bits. In a further example, the method further includes storing the secure token in a database, and associating the secure token with the stored hash value. In yet another example, the method further includes the one or more processor device pre-filling a sign-up template with account details of the requesting entity. Here, the account details may be received via an identification query string parameter associated with the requesting entity.

And according to other aspects of the technology, a device is provided that includes a communication unit and one or more processors configured to perform selected operations. In particular, responsive to receiving a hash value from a computing device of a trusted provider, the one or more processors are configured to store the hash value in memory. The hash value corresponds to plain-text information associated with a requesting entity. The plain-text information includes contact information about the requesting entity. The one or more processors are also configured to generate a secure token associated with a storage location of the hash value. Responsive to receiving a verification message from a first external device of the requesting entity, the one or more processors are configured to process the verification message using a hash function to generate a hash value, retrieve the hash value stored in the memory, compare a generated hash value with the hash value retrieved from the memory, and compare the generated secure token with token information in the verification message, in order to verify an identify of the requesting entity.

In one example, the secure token associated with the storage location is created by generating a random token string and recording an association between the random token string and the storage location. In this case, a length of the random token string may be at least 16 bits. In another example, the one or more processors are further configured to store the secure token in a database and associate the secure token with the stored hash value. In a further example, the one or more processors are also configured to pre-fill a sign-up template with account details of the requesting entity. In this situation, the account details may be received via an identification query string parameter associated with the requesting entity.

BRIEF DESCRIPTION OF THE DRAWINGS

Accompanying this specification is a set of drawings illustrating various features and aspects of the technology. In the drawings, like reference numerals refer to like elements. A brief discussion of each drawing is provided below.

The following description is based on embodiments of the claims and should not be taken as limiting the claims with regard to alternative embodiments that are not explicitly described herein.

DETAILED DESCRIPTION

Overview

The authenticating protocol discussed herein includes interaction between a requesting entity, a Trusted Provider and an authenticating entity. The requesting entity relies on the Trusted Provider to effectively vouch for the requesting entity with the authenticating entity, but without sharing the requesting entity's confidential or other personal information directly with the authenticating entity. This approach does not require any of the entities to perform advanced cryptographic operations or store sensitive information beyond what would normally be required for day to day work. It keeps managerial or resource overhead to a minimum, for instance via a spreadsheet or streamlined database. This makes it attractive to individuals, small businesses and other requesting entities, as well as Trusted Providers that interface with authorizing entities.

Figure 1:
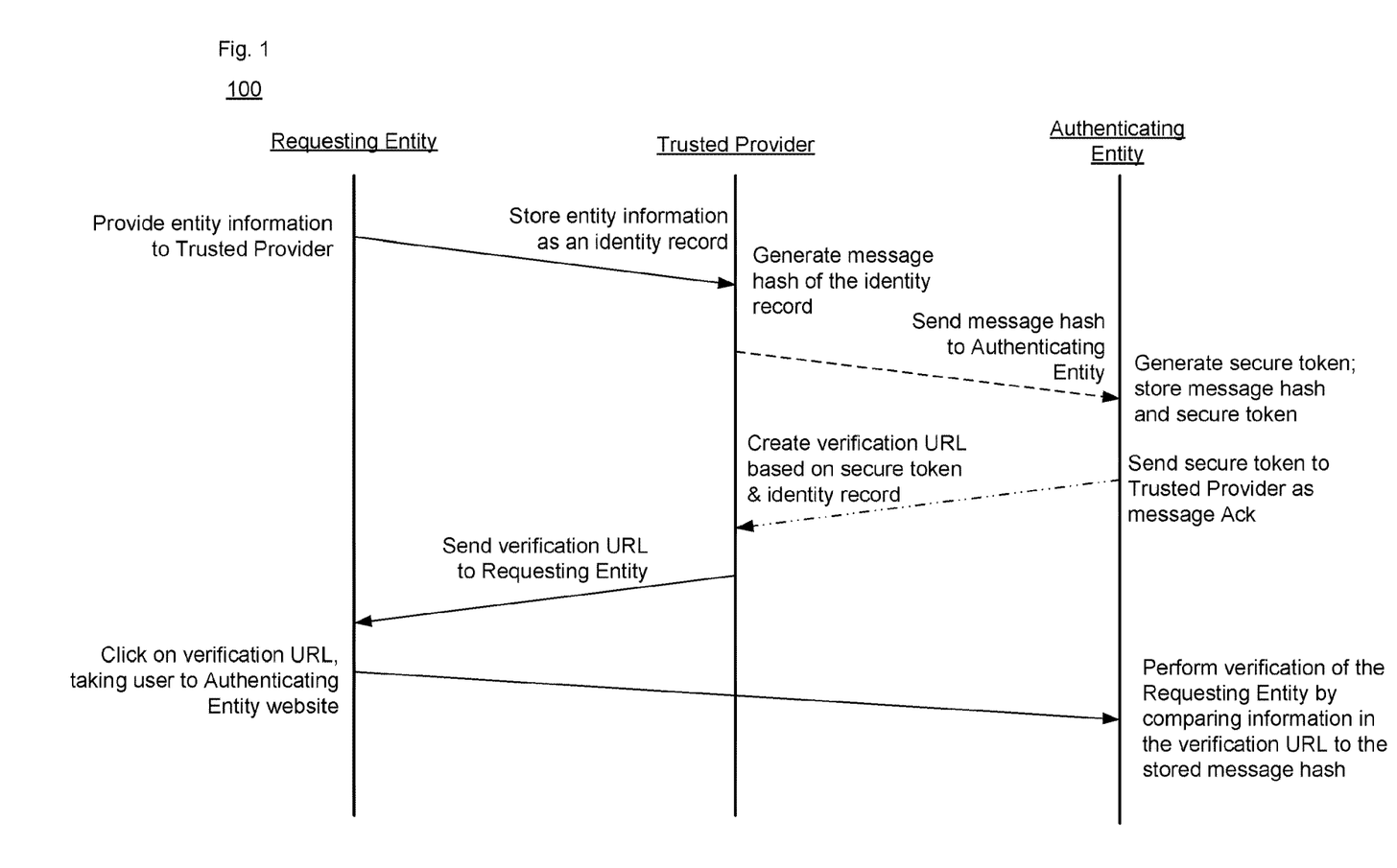
FIG. 1 illustrates an example process according to aspects of the disclosure.

An example of the authenticating protocol is illustrated in FIG. 1. Here, as discussed in more detail below, is a process flow from a requesting entity to a Trusted Provider to an authenticating entity, and then back to the Trusted Provider and the requesting entity. At a high level, the protocol allows a Trusted Provider to generate verification codes—preferably verification URLs—without sharing the requesting entity's personal data with the authenticating entity. For instance, the protocol involves the Trusted Provider performing some tasks and interaction with the authenticating entity and then being able to deliver the verification URL directly to the requesting entity. When someone at the requesting entity receives the URL and clicks on it, they are automatically verified with the authenticating entity. The authenticating entity thus acquires knowledge of the existence of requesting entity at the time the requesting entity activates the link, not before.

In particular, as shown in FIG. 1, the requesting entity initially provides certain information ("entity information") to the Trusted Provided. That may be through an ordinary course of business with that Trusted Provider. For example, a person or business may open an account with a bank or set up service with a telecommunications provider. The entity information would be, for instance, name and address or other contact information about the requesting entity. The entity information is stored by the Trusted Provider as identity information in an identity record.

By way of example, the requesting entity's details ("entity information") stored by the Trusted Provider may be referred to as an identity of the requesting entity. The identity may typically include the name of a point of contact (e.g., business owner) and a physical street address associated with the business or other requesting entity. The identity information may be stored by the Trusted Provider, e.g., as part of a spreadsheet or record in a customer relationship management (CRM) database. The identity information may be arranged as a plain text message ("identity record") in the JavaScript Object Notation (JSON) format.

At some point, the requesting entity may ask the Trusted Provider to vouch for that entity with an authenticating entity. This may be done, for instance, so that the requesting entity can access services offered by the authenticating entity. The Trusted Provider creates and shares a secure hash (message hash) of the requesting entity's details (identity record) with the authenticating entity.

In particular, the message hash is sent to the authenticating entity by the Trusted Provider. The authenticating entity generates a secure token, which returned to the Trusted Provider and acts as a message acknowledgement for the provided message hash. The message hash and secure token are stored by the authenticating entity for later verification of the relevant requesting entity.

Once the Trusted Provider receives the acknowledgement, it uses the secure token to create a verification link. For instance, a verification URL is created at the Trusted Provider for the requesting entity to sign up directly with the authenticating entity. The URL is created based on both the secure token received from the authenticating entity and the identity record stored by the Trusted Provider.

The verification URL is then sent to the requesting entity. As shown in FIG. 1, when the requesting entity wants to sign up or otherwise register with the authenticating entity, the verification URL is clicked or otherwise enabled. This opens a connection to the authenticating entity's website. At this point, the authenticating entity detects whether the data it receives from the requesting entity hashes to the same value provided by the Trusted Provider and stored in memory by the authenticating entity. Assuming that the information is correct, the requesting entity is instantly validated with the authenticating entity.

Example Arrangement

Figure 2A:
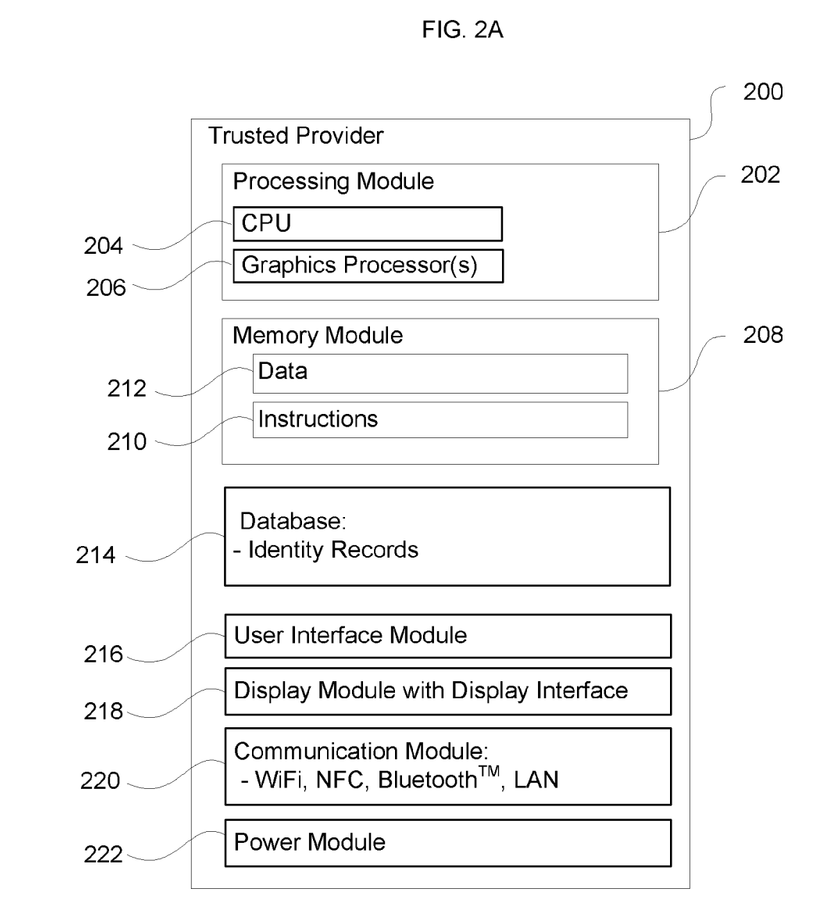
FIG. 2A is an example Trusted Provider arrangement in accordance with aspects of the disclosure.

FIG. 2A illustrates an example Trusted Provider configuration 200 that may be employed with the authenticating protocol disclosed herein. As shown, the configuration 200 includes a processing module 202 having one or more computer processors such as a central processing unit 204 and/or graphics processors 206, as well as memory module 208 configured to store instructions 210 and data 212. A database 214 may or may not be separate from the memory module 208. The processors may or may not operate in parallel, and may include ASICs, controllers and other types of hardware circuitry. The processors are configured to receive information from a user through user interface module 216, and to present information to the user on a display device of the display module 218 having a display interface.

User interface module 216 may receive commands from a user via user inputs and convert them for submission to a given processor. The user inputs may include one or more of a touch screen, keypad, mouse, stylus, microphone, or other types of input devices. The display module 218 may comprise appropriate circuitry for driving the display device to present graphical and other information to the user. By way of example, the graphical information may be generated by the graphics processor(s) 206, while CPU 204 manages overall operation of the Trusted Provider configuration 200.

Memory module 208 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively the memory module 208 may also include DVD, CD-ROM, write-capable, and read-only memories. In one implementation, a computer program product is tangibly embodied in an information carrier. The computer program product contains instructions, such as instructions 210 that, when executed by one or more processors, perform one or more methods such as those described herein. The information carrier is a computer- or machine-readable medium, such as memory module 208. Although FIG. 2A functionally illustrates the processor(s), memory module, and other elements of device 200 as being within the same overall block, such components may or may not be stored within the same physical housing. For example, some or all of the instructions and data may be stored on an information carrier that is a removable storage medium (e.g., optical drive or USB drive) and others stored within a read-only computer chip. Alternatively, the database 214 may store identity records in an arrangement physically separate from the rest of the Trusted Provider arrangement 200.

The data 212 may be retrieved, stored or modified by the processors in accordance with the instructions 210. For instance, although the claimed subject matter is not limited by any particular data structure, the data may be stored in computing device registers, in a relational database as a table having a plurality of different fields and records, XML documents or flat files. The data 212 may also be formatted in any computing device-readable format.

The instructions 210 may be any set of instructions to be executed directly (such as machine code) or indirectly (such as scripts) by the processor(s). For example, the instructions may be stored as computing device code on the computing device-readable medium. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance. Functions, methods and routines of the instructions are explained in more detail below.

As also shown in FIG. 2A, the Trusted Provider configuration 200 includes a communication module 220 for communicating with other devices and systems, including requesting entities and one or more authorizing entities. The communication module 220 includes a wireless transceiver; alternatively, the module may include a wired transceiver, or both. The Trusted Provider configuration 200 may communicate with other remote devices via the communication module 220 using various configurations and protocols, including short range communication protocols such as near-field communication, Bluetooth™, Bluetooth™ Low Energy (LE), or other ad-hoc networks, the Internet, intranets, virtual private networks, wide area networks, local networks, private networks using communication protocols proprietary to one or more companies, Ethernet, WiFi and HTTP, and combinations of the foregoing. In addition, the Trusted Provider configuration 200 as shown includes a power module 222.

In one example the Trusted Provider applies a secure hashing function to hash the identity information of the requesting entity. As mentioned above, the identity record may be in the JavaScript Object Notation (JSON) format. For example, the Trusted Provider may "stringify" the identity record JSON, e.g., with UTF-8 encoding. It may optionally then base-64 encode it. This data can then be provided to the hashing function, e.g., a SHA-256 hashing function. The result of the hashing process is a message hash. The message hash is a specific representation of the data, but is not the data itself. For added security of the Trusted Provider against reengineering of the hash, random data ("salt") may be added to the identity record JSON prior to performing the hashing process. By way of example only, the salt may include one or more bytes of random data. The Trusted Provider is then able to share the message hash with the authenticating entity via an HTTP POST request or other transmission.

Figure 2B:
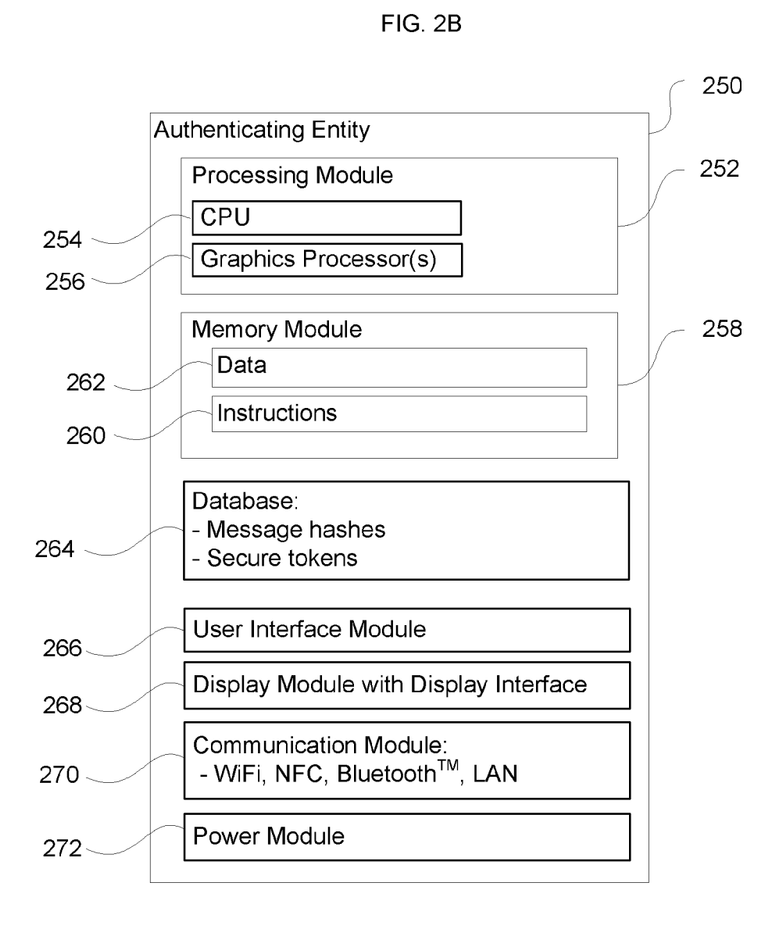
FIG. 2B is an example authenticating entity arrangement in accordance with aspects of the disclosure.

An example authenticating entity configuration 250 is shown in FIG. 2B. This configuration is similar to the Trusted Provider configuration 200. For instance, the configuration 250 includes a processing module 252 having one or more computer processors such as a central processing unit 254 and/or graphics processors 256, as well as memory module 258 configured to store instructions 260 and data 262. A database 264 may or may not be separate from the memory module 208. This database is arranged to store received message hashes and secure tokens created by the authenticating entity.

The processors may or may not operate in parallel, and may include ASICs, controllers and other types of hardware circuitry. The processors are configured to receive information from a user through user interface module 266, and to present information to the user on a display device of the display module 268 having a display interface. The processors, memory module, user interface module and display module operate in the same way described above for the Trusted Provider configuration 200. And similar to the database 214, the database 264 may store message hashes and secure tokens in an arrangement physically separate from the rest of the authenticating entity configuration 250.

As also shown in FIG. 2B, the authenticating entity configuration 250 includes a communication module 270 for communicating with other devices and systems, including requesting entities and one or more Trusted Providers. The communication module 270 may have an equivalent arrangement to that described for the communication module 220. In addition, the authenticating entity configuration 250 as shown includes a power module 272.

Upon receipt of the message hash, the authenticating entity does several things. First, it may validate that the Trusted Provider is itself authorized to vouch for the requesting entity. If validation fails, the process would stop and the requesting entity would have to use a more formal and direct verification process with the requesting entity. Assuming validation of the Trusted Provider is successful, the authenticating entity creates the secure token to act as a receipt of the message hash. The secure token should be unrelated to the received message hash. For instance, the secure token may be a random nonce (e.g., 16 bytes or more). The authenticating entity stores the message hash and the secure token in database 264, and sends a copy of the secure token back to the Trusted Provider. Thus, it can be seen that the Trusted Provider does not provide a clear-text version of the identity record JSON to the authenticating entity, and the authenticating entity cannot reverse engineer the identity information of the requesting entity.

At this point, once the Trusted Provider has the secure token, the Trusted Provider can effectively share the identity record and the secure token with the requesting entity. This can be done, for instance, by the Trusted Provider generating a verification URL for the requesting entity based on the identity record and the received secure token. In one example, the verification URL incorporates the stringified version of the identity record and the secure token, with a pointer to the authenticating entity's website. The Trusted Provider may store the received secure token in the database 214, for instance in association with the related identity record or separately. Alternatively, the Trusted Provider may not store the received secure token once the verification URL has been generated.

Once generated, the verification URL is sent to the requesting entity directly from the Trusted Provider. This, in turn, allows the person or user at the requesting entity to click on the link or otherwise initiate verification. When the verification URL is activated, the requesting entity's web browser is taken to the authenticating entity's website, where the requesting entity user can have themselves or their business verified automatically by the authenticating entity.

In particular, the authenticating entity validates the information received via the verification URL in accordance with the message hash previously received by the authenticating entity from the Trusted Provider. When the requesting entity clicks on the verification URL link, the authenticating entity will validate the stringified version of the identity information and the secure token. For the latter, the secure token stored by the authenticating entity in memory is compared against the received secure token to confirm a match. For the identity information, the authenticating entity's system will perform a hash process and compare the result with the message hash that was previously received from the Trusted Provider.

The authenticating entity can pre-fill a sign-up screen with the person's or business's details. This is possible because the details are encoded in plain-text in a identification query string parameter associated with the requesting entity's details, in accordance with the message hash previously received from the Trusted Provider.

The authenticating entity may also verify that the identity information corresponds to something that the Trusted Provider had the right to provide. For instance, there may be geographical or other restrictions on what the Trusted Provider can certify.

One the verifications are satisfied, the authenticating entity determines that the verification URL is legitimate and was generated by a Trusted Provider that is authorized by the authenticating entity. If so, the data of the requesting entity may be immediately verified. Thus, in this way the system allows Trusted Providers to vouch for the identities of their users to an authenticating entity, and to enable the users to be instantly verified by the authenticating entity without having to exchange sensitive information about themselves or their business.

Figure 3:
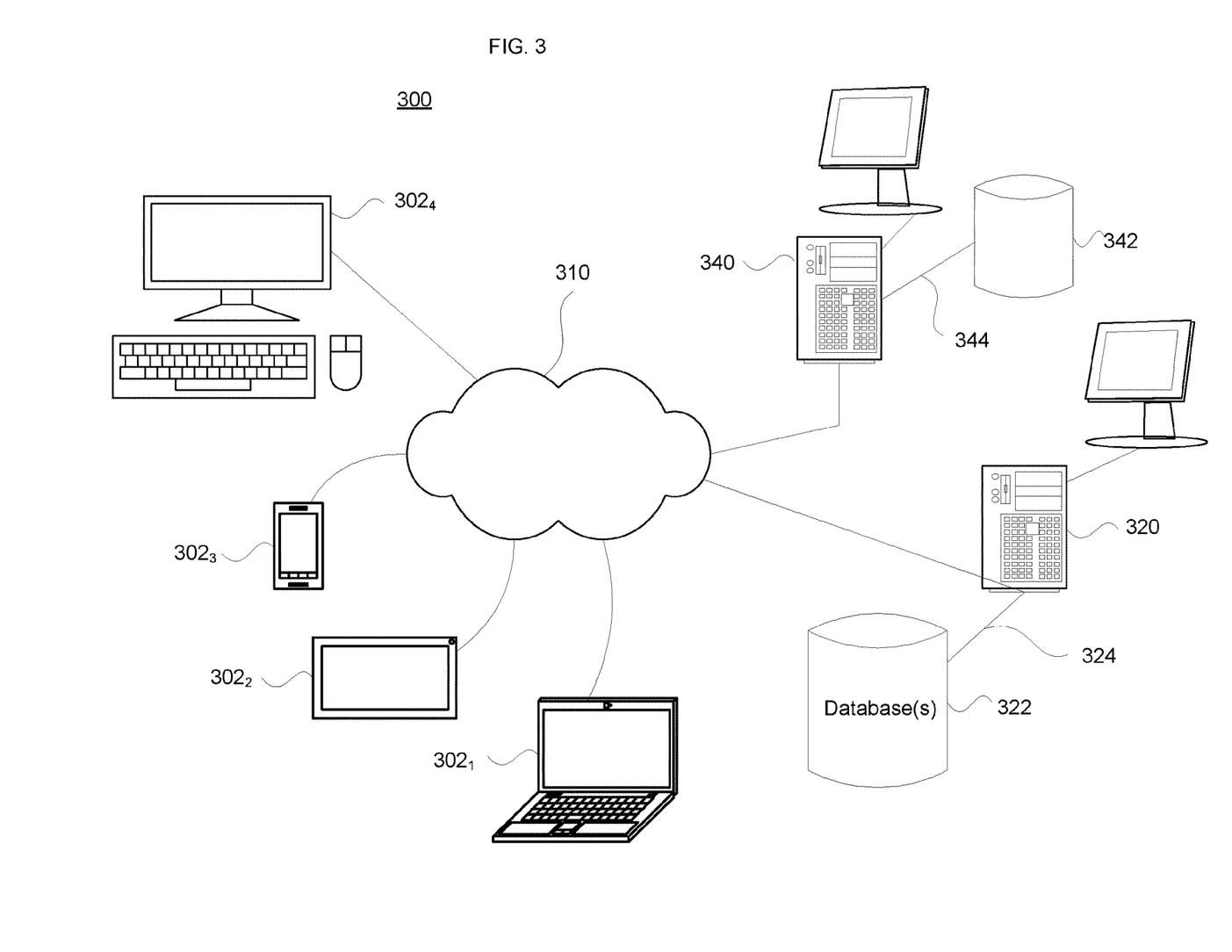
FIG. 3 illustrates an example network in accordance with aspects of the disclosure.

FIG. 3 illustrates an example arrangement in which different requesting entity devices 300, e.g., $300_1$, $300_2$, $300_3$ and $300_4$ may request content or other information from a Trusted Provider 320 and an authenticating entity 340 via communication system 310. The requesting entity devices 300 may include some or all of the components discussed above with regard to Trusted Provider configuration 200 and authenticating entity configuration 250. The requesting entity devices may include laptops ($300_1$), tablets ($300_2$), cellular phones or PDAs ($300_3$) or desktop PCs ($300_4$). However, other requesting entity devices may also be employed a requesting entity such as an individual, small business or corporation. Any such requesting entity devices may send information to a Trusted Provider, receive verification URLs, and request verification from an authenticating entity as shown in FIG. 1.

As shown, the Trusted Provider 320 may connect to database 322 via link 324. The Trusted Provider 320 and database 322 correspond to the Trusted Provider configuration 200 described above with regard to FIG. 2A. Similarly, authenticating entity may connect to database 342 via link 344. The authenticating entity 340 and database 342 correspond to the authenticating entity configuration 250 described above with regard to FIG. 2B. While only one Trusted Provider 320 and only one authenticating entity 340 is shown in FIG. 3, any number of Trusted Providers and authorizing entities may be included.

Example Methods

Figure 4:
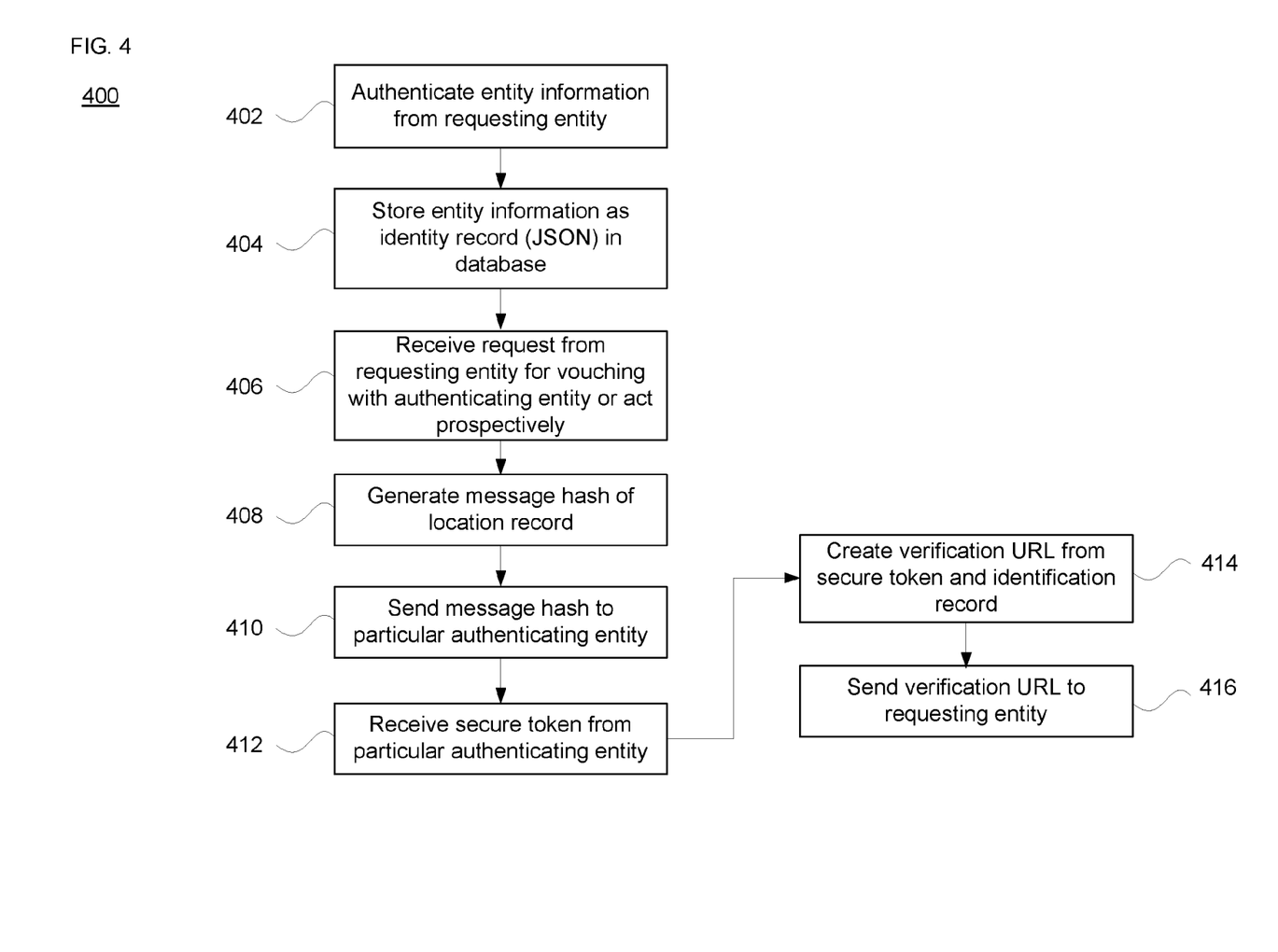
FIG. 4 illustrates an example requesting process in accordance with aspects of the disclosure.

One example scenario of Trusted Provider operation is shown in relation to flow diagram 400 of FIG. 4. Here, in block 402 the process includes authenticating information from the requesting entity, for example name and address or other contact information. This may be done based on the Trusted Provider's preexisting interaction with the requesting entity, for instance by confirming a contact name and mailing address for which notices to the requesting entity are sent. This information is stored as an identity record in block 404. This may be in a JSON format or other format, depending on the configuration of the Trusted Provider's database. These operations may be done at a point in time when the requesting entity opens an account or otherwise engages the services of the Trusted Provider.

the Trusted Provider may receive a request from the requesting entity at block 406. This may include a request that the Trusted Provider vouch for the requesting entity with a particular authenticating entity. Or, alternatively, the Trusted Provider may act prospectively. Based on either a request or prospective action, the Trusted Provider generates a message hash of the identity record at block 408. Approaches for doing this by the processors of the Trusted Provider are discussed above. The message hash is transmitted to the particular authenticating entity at block 410. Then in response the Trusted Provider receives a secure token at block 412. The secure token, such as a nonce or other information, represents an acknowledgment that the authenticating entity has received the message hash.

Once the secure token is received, the processor(s) of the Trusted Provider creates the verification URL using the secure token and stored identity record at block 414. This information is then transmitted to the requesting entity at block 416. At this point, the Trusted Provider has completed its portion of the verification process.

Figure 5:
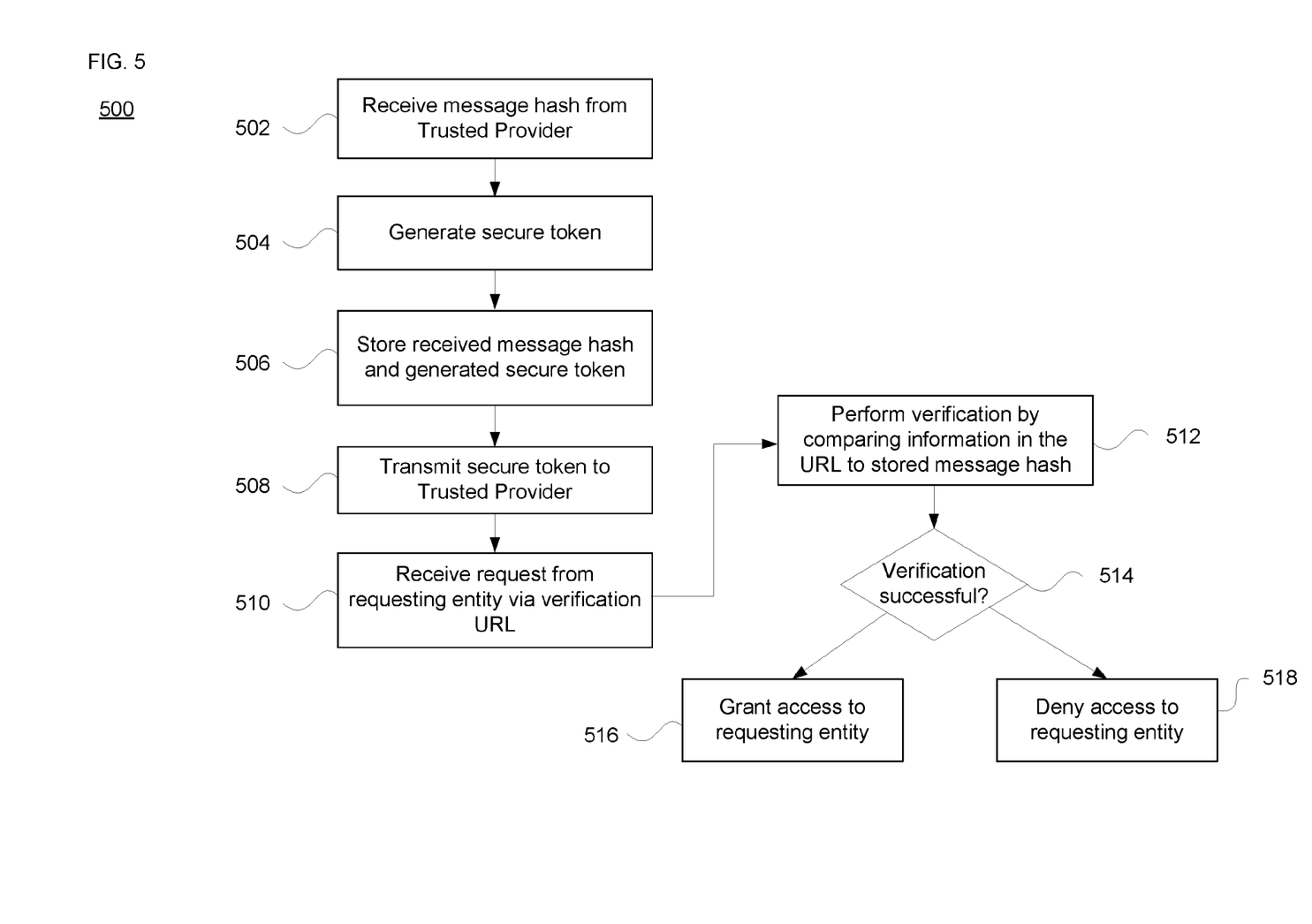
FIG. 5 illustrates an example verification process in accordance with aspects of the disclosure.

FIG. 5 illustrates an example process 500 for authenticating entity operation. At block 502, the authenticating entity receives a message hash from a Trusted Provider. Based on this, at block 504 a secure token is generated by one or more processors of the authenticating entity. As noted above, the secure token may be a random nonce. Then, at block 506, the received message hash and the generated secure token are stored in memory, for instance in database 264 of FIG. 2B (or equivalent database 342 of FIG. 3). The secure token is transmitted to the Trusted Provider in block 508. Then, upon the requesting entity activating (e.g., clicking) the verification URL, the authenticating entity receives that information from the requesting entity at block 510. At this point, the processors of the authenticating entity perform a verification operation at block 512. This includes comparing information from the received verification URL against the stored message hash, as well as confirming that the received secure token information from the verification URL matches to the secure token stored in the database of the authenticating entity. Block 514 examines whether verification is successful. If so, at block 516 the requesting entity is granted access by the authenticating entity. Depending on the type of authenticating entity and the type of requesting entity, this may enable the requesting entity to perform certain operations or enable it to provide selected goods or services. If the verification process fails, the requesting entity is denied access at block 518.

The logic and process flows depicted in the figures and described herein are not limited to a particular order or sequence unless expressly stated. In addition, other steps may be provided, or steps may be eliminated, from the described flows, and other components may be added to, or removed from, the described systems.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method comprising:
   processing, by one or more processors of a trusted provider serving as an intermediary between a requesting entity and an authenticating entity, a plain-text message using a hash function to generate a hash value of the plain-text message, wherein the plain-text message includes contact information about a first external device of the requesting entity;
   sending, by a communication unit of the trusted provider, the generated hash value to a second external device of the authenticating entity, the second external device of the authenticating entity being different from the first external device of the requesting entity;
   receiving, by the communication unit of the trusted provider, a secure token from the second external device of the authenticating entity in response to sending the generated hash value, the secure token being different from the generated hash value;
   responsive to receiving the secure token from the second external device of the authenticating entity, creating, by the one or more processors of the trusted provider, a verification indication based on the secure token and the plain-text message; and
   sending, by the communication unit of the trusted provider, the verification indication to the first external device of the requesting entity.

2. The method of claim 1, wherein the processing is performed in response to receiving the plain-text message from the first external device of the requesting entity, the plain-text message comprising the contact information of the requesting entity.

3. The method of claim 1, wherein the plain-text message comprises the contact information includes a physical address of a business or person associated with the requesting entity.

4. The method of claim 1, wherein the plain-text message comprises an identity javascript object notification (JSON) of the contact information.

5. The method of claim 1, wherein:
processing the plain-text message further comprises adding a salt element to the plain-text message and processing the plain-text message with the pre-defined salt element using the hash function; and
sending the verification indication to the first external device of the requesting entity comprises sending a verification URL incorporating the secure token and information of the plaintext message to the first external device.

6. A trusted provider device configured to serve as an intermediary between a requesting entity and an authenticating entity, the device comprising:
a communication unit; and
one or more hardware processors configured to:
retrieve, from memory, a plain-text message containing information of the requesting entity, the information including contact information about the requesting entity;
process the plain-text message using a hash function to generate a hash value of the plain-text message;
send the generated hash value to a second external device of the authenticating entity;
receive, from the second external device of the authenticating entity, a secure token different from the generated hash value;
create a verification indication based on the plain-text message and the secure token received from a second external device of the authenticating entity; and
send the verification indication to a first external device of the requesting entity.

7. The device of claim 6, wherein the plain-text message comprises the contact information including a physical address of a business or person associated with the requesting entity.

8. The device of claim 6, wherein the plain-text message comprises an identity javascript object notification (JSON) of the contact information.

9. The device of claim 6, wherein the one or more processors are further configured to:
add a salt element to the plain-text message and process the plain-text message with the predefined salt element using the hash function; and
send the verification indication to the first external device of the requesting entity by sending a verification URL incorporating the secure token and information of the plain-text message to the first external device.

10. A method comprising:
responsive to receiving a hash value from a computing device of a trusted provider:
storing the hash value in memory, the hash value corresponding to plain-text information associated with a requesting entity, the plain-text information including contact information about the requesting entity, and
generating, by one or more processor devices, a secure token associated with a storage location of the hash value; and
responsive to receiving a verification message from a first external device of the requesting entity:
processing, by the one or more processor devices, the verification message using a hash function to generate a hash value,
retrieving the hash value stored in the memory,
comparing a generated hash value with the hash value retrieved from the memory, and
comparing the generated secure token with token information in the verification message, in order to verify an identify of the requesting entity.

11. The method of claim 10, wherein generating the secure token associated with the storage location comprises generating a random token string and recording an association between the random token string and the storage location.

12. The method of claim 11, wherein a length of the random token string is at least 16 bits.

13. The method of claim 10, further comprising storing the secure token in a database, and associating the secure token with the stored hash value.

14. The method of claim 10, further comprising the one or more processor device pre-filling a sign-up template with account details of the requesting entity.

15. The method of claim 14, wherein the account details are received via an identification query string parameter associated with the requesting entity.

16. A device comprising:
a communication unit; and
one or more hardware processors configured to:
responsive to receiving a hash value from a computing device of a trusted provider:
store the hash value in memory, the hash value corresponding to plain-text information associated with a requesting entity, the plain-text information including contact information about the requesting entity, and
generate a secure token associated with a storage location of the hash value; and
responsive to receiving a verification message from a first external device of the requesting entity:
process the verification message using a hash function to generate a hash value,
retrieve the hash value stored in the memory,
compare a generated hash value with the hash value retrieved from the memory, and
compare the generated secure token with token information in the verification message, in order to verify an identify of the requesting entity.

17. The device of claim 16, wherein the secure token associated with the storage location is created by generating a random token string and recording an association between the random token string and the storage location.

18. The device of claim 17, wherein a length of the random token string is at least 16 bits.

19. The device of claim 16, wherein the one or more processors are further configured to store the secure token in a database and associate the secure token with the stored hash value.

20. The device of claim 16, wherein the one or more processors are further configured to pre-fill a sign-up template with account details of the requesting entity.

21. The device of claim 20, wherein the account details are received via an identification query string parameter associated with the requesting entity.

* * * * *